United States Patent Office.

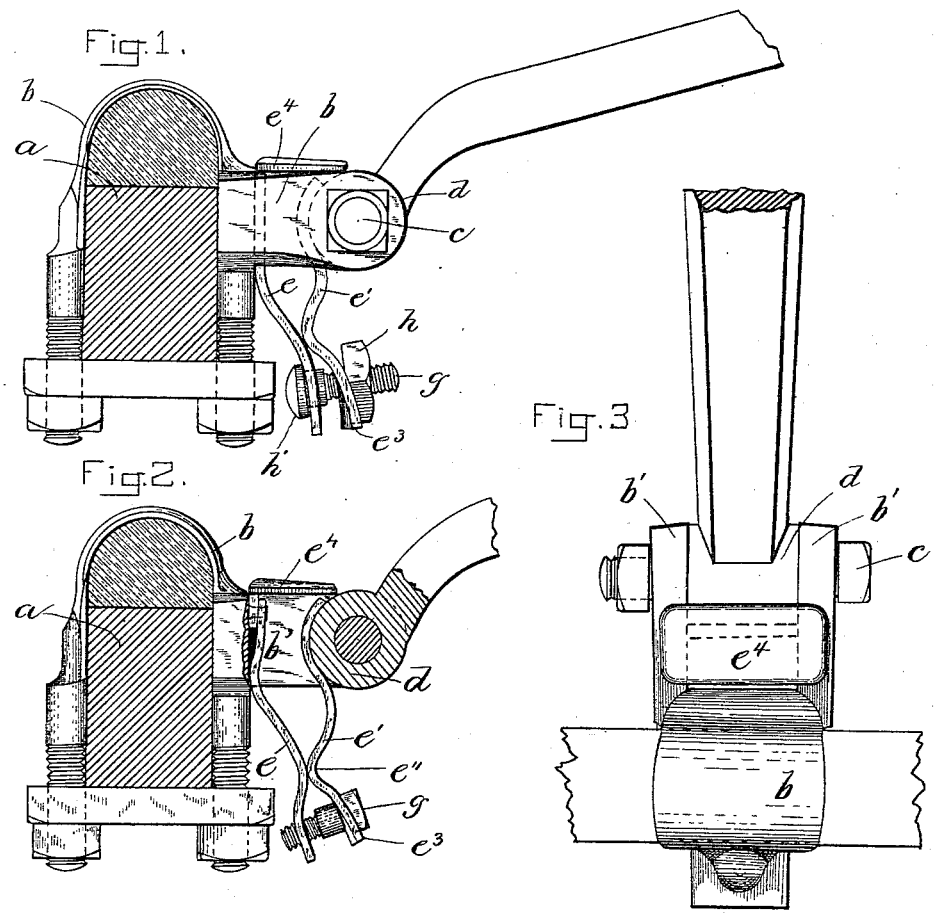

ELIHU WILDER, OF NEWTON, MASSACHUSETTS.

THILL-COUPLING.

SPECIFICATION forming part of Letters Patent No. 458,310, dated August 25, 1891.

Application filed January 3, 1891. Serial No. 376,580. (No model.)

*To all whom it may concern:*

Be it known that I, ELIHU WILDER, of Newton, in the county of Middlesex and State of Massachusetts, have invented certain new and useful Improvements in Devices for Preventing Rattling in Thill-Couplings, of which the following is a specification.

This invention is an improvement in devices for preventing rattling in thill-couplings.

This invention has for its object to provide an adjustable spring adapted to be interposed between the thill-iron and the clip of the axle to prevent rattling of the thill-couplings; and it consists in a spring composed of two parts, one of which has a bearing on the other, whereby it may be rocked, the two parts being connected by suitable means which permit the adjustment of the parts to the distance between the clip and the socket of the thill-iron, as I will now proceed to describe.

In the accompanying drawings, forming a part of this specification, Figure 1 represents a transverse section of a carriage-axle, showing one form of my improved device. Fig. 2 represents a similar view showing a modification. Fig. 3 represents a top view.

The same letters of reference indicate the same parts in all the figures.

In the drawings, $a$ represents an axle, and $b$ the clip, which is secured in the usual manner to the axle and has the ears $b'$, which receive the bolt $c$, that connects the socket $d$ of the thill-iron to said ears.

In carrying out my invention I provide an anti-rattling spring composed of two parts or members $e\ e'$, which are interposed between the clip $b$ and the socket $d$, said members being composed of strips of steel or other suitable metal. The member $e$ bears against one side of the clip and may be attached thereto by screws or not, as may be preferred. The other member $e'$ is formed with a concavity, which fits the curvature of the inner side of the socket $d$, and is adjustable toward or from the member $e$ by an adjusting device supported jointly by the two members $e$ and $e'$. In Figs. 1 and 2 I have shown the said adjusting device as composed of a screw $g$, passing through orifices in the lower ends of the members $e\ e'$. In Fig. 1 said screw is shown as provided with a nut $h$ and with a head $h'$, said head bearing against the member $e$, while the nut bears against the member $e'$. In Fig. 2 the screw has no nut and works in a threaded orifice in the member $e$. The member $e'$ is curved inwardly at $e''$ to form a fulcrum or rest adapted to bear upon the member $e$ above the screw $g$. It will be seen that by adjusting the nut $h$ or turning the screw $g$, so as to force the lower ends of the members $e$ and $e'$ toward each other, the concave end of the member $e'$ will be forced outwardly and caused to bear with an increased pressure on the socket $d$, while by an opposite adjustment of the screw the pressure of the member $e'$ upon the socket may be decreased. It will be seen that by this device I am enabled to adjust the pressure upon the socket $d$ and accommodate the adjusting device to the width of the space existing between the clip $b$ and the socket $d$.

To prevent the accidental rotation of the screw $g$ or the nut $h$, I provide the plate or member $e'$ with one or more outwardly-bent ears $e^3$, which bear on the sides of the nut $h$, as in Fig. 1, and against the head of the bolt $g$, as in Fig. 2. The member $e$ is shown in Figs. 1, 2, and 4 as provided with a horizontal ear $e^4$, bearing on the upper ends of the clip-ears $b'$ and constituting a desirable finish. Said ear $e^4$ also supports the device and prevents it from dropping through the space between the clip and the socket $d$.

I claim—

1. The improved anti-rattling device for thill-couplings, composed of the spring members $e\ e'$, formed to be interposed between the clip and the socket of the iron, one of said members having a concave portion formed to receive the socket of the thill-iron and being fulcrumed on the other member, the adjusting bolt or screw connecting the outer ends of said members, and the ear $e^4$, formed on one of the members and arranged to bear on the ears of the clip, as set forth.

2. The improved anti-rattling device for thill-couplings, composed of the spring members $e\ e'$, formed to be interposed between the clip and the socket of the iron, the adjusting bolt or screw connecting the outer ends of said members, and the ear or ears $e^3$, formed on one of said members to prevent the loosening of the bolt or screw, as set forth.

In testimony whereof I have signed my name to this specification, in the presence of two subscribing witnesses, this 1st day of January, A. D. 1891.

ELIHU WILDER.

Witnesses:
C. F. BROWN,
EWING W. HAMLEN.